UNITED STATES PATENT OFFICE.

HERBERT H. D. PEIRCE, OF NEW YORK, N. Y.

GLASS FOR DECORATIVE PURPOSES.

SPECIFICATION forming part of Letters Patent No. 267,713, dated November 21, 1882.

Application filed March 6, 1882. (No specimens.)

*To all whom it may concern:*

Be it known that I, HERBERT H. D. PEIRCE, of the city, county, and State of New York, have invented a new and useful Improvement in Glass for Decorative Purposes in Architecture, of which the following is a specification.

This invention relates to an improvement in glass for use for mosaic work, for wall decoration, or for other decorative purposes, and has for its object the production of such glass at less cost than that in common use and of greater brilliancy, and with opalescent and iridescent effects.

The kind of glass known as "opal" glass is prepared by adding to the usual materials used in the manufacture of glass peroxide of tin or stannic acid, antimonic acid, chloride of silver, phosphate of lime or bone-ashes, or other materials, by means of which the glass is rendered more or less opaque or milky, according to the proportion of the insoluble mass deposited or contained in it; and this glass may also be colored in the usual way to a greater or less degree, as may be desired. I have found that when such opal glass is silvered on its inner or under surface in the manner that mirrors are made the rays of light reflected from the metallic surface are broken or diverted by the opalescent glass through which they are transmitted, so that such silvered opalescent glass does not act as a mirror and reflect the images of objects, but reflects the rays of light irregularly, with the production of beautiful opalescent and iridescent effects, which greatly increase its brilliancy and render it particularly valuable for the production of mosaic work for wall decoration; and my invention therefore consists in glass prepared in such a manner as to produce these effects.

The kind of glass which I use may be ordinary opal glass, of any desired color and with any degree of opacity, or it may be plain or colored glass rendered opalescent by having superimposed upon it one or more layers of opal glass, and the silvering of the glass to produce the mirror surface will be effected in the usual manner.

What I claim as my invention, and desire to secure by Letters Patent, is—

As an article of manufacture for mosaic or other decorative work, glass rendered opalescent and silvered upon its inner or under surface, so that light is reflected through the glass, substantially as and for the purposes set forth.

In witness whereof I have hereunto set my hand in the presence of the subscribing witnesses.

HERBERT H. D. PEIRCE.

Witnesses:
ALEX. L. HAYES,
WOODWARD EMERY.